United States Patent

Kusich

[15] 3,652,807

[45] Mar. 28, 1972

[54] MAGNETIC TAPE RECORDING AND PLAYBACK SYSTEM DESIGNED FOR LOW VOLTAGE DC POWER SOURCES

[72] Inventor: Robert A. Kusich, Walnut Creek, Calif.

[73] Assignees: Wesley C. Keys; Wesley G. Schirman; Milton C. Johnson; Audio Research Manufacturing Co., San Francisco, Calif.

[22] Filed: Apr. 2, 1970

[21] Appl. No.: 25,071

[52] U.S. Cl.....................................179/100.2 R, 331/113 A

[51] Int. Cl...........................................................G11b 5/44

[58] Field of Search....................179/100.2 R; 307/248, 249; 331/113 A

[56] References Cited

UNITED STATES PATENTS

| | | | |
|---|---|---|---|
| 3,428,759 | 2/1969 | Wolters | 331/113 A |
| 3,189,731 | 6/1965 | Bowman | 179/100.2 R |
| 3,470,496 | 9/1969 | Dembling | 331/113 A |
| 3,354,270 | 11/1967 | Smith et al. | 331/113 A |
| 3,241,032 | 3/1966 | Firestone | 331/113 A |
| 3,323,078 | 5/1967 | Falk | 179/100.2 R |

*Primary Examiner*—Bernard Konick
*Assistant Examiner*—Alfred H. Eddleman
*Attorney*—Fryer, Tjensvold, Feix, Phillips & Lempio

[57] ABSTRACT

A magnetic tape recording and playback system designed to be powered from low voltage DC sources includes its own integral power supply that supplies a high voltage alternating output of a frequency of 30 kHz. to 100 kHz. to drive the bias and erase circuits and also supplies a DC voltage higher than the DC source voltage for powering the pre-amplifiers and power amplifiers in the system. It is particularly adaptable to systems employing integrated circuits (ICs) in the amplifier circuits, such as are now being sold for installation in automobiles.

8 Claims, 1 Drawing Figure

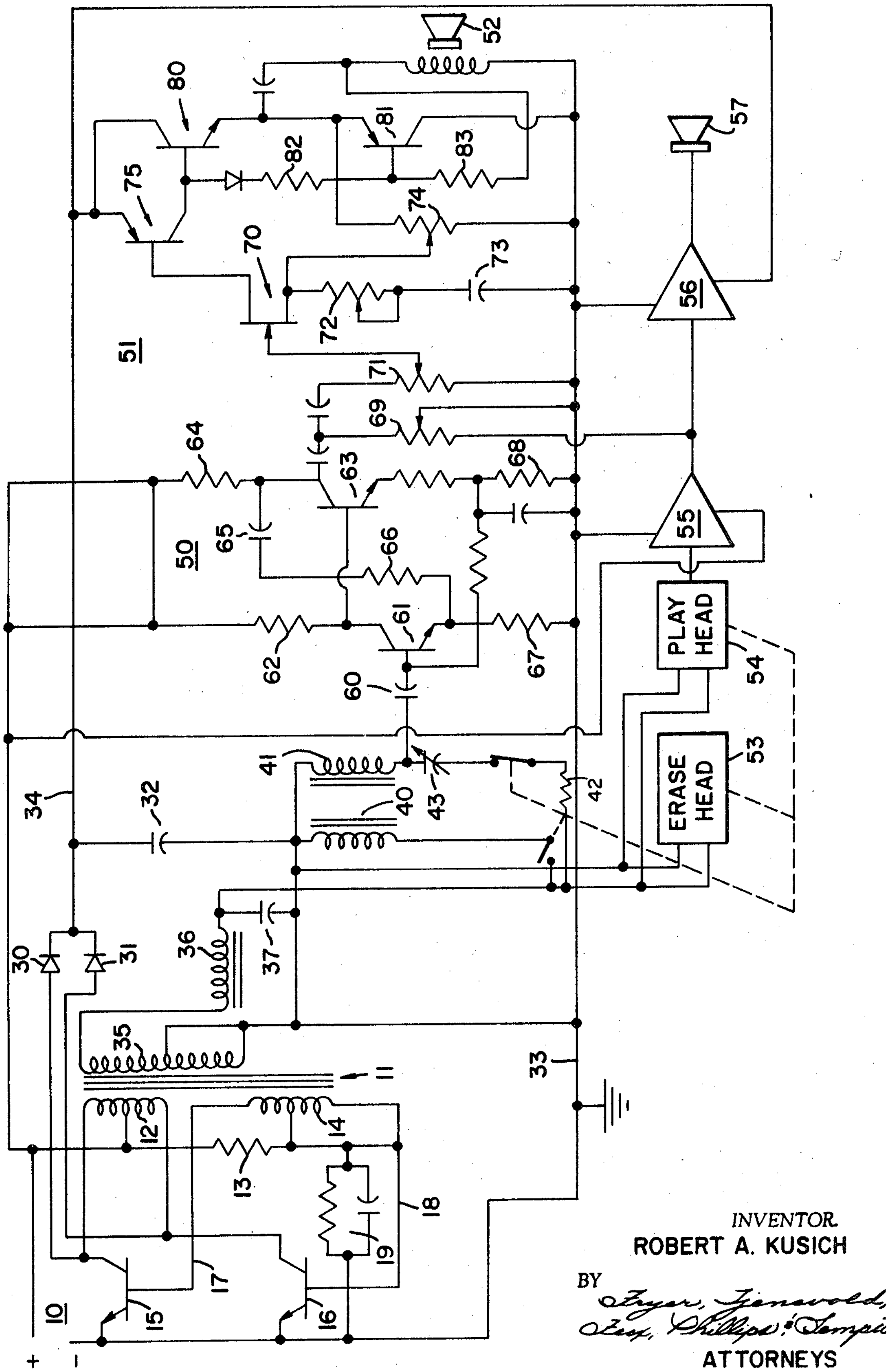
INVENTOR.
ROBERT A. KUSICH
BY Fryer, Tjensvold, Feix, Phillips & Lempio
ATTORNEYS

MAGNETIC TAPE RECORDING AND PLAYBACK SYSTEM DESIGNED FOR LOW VOLTAGE DC POWER SOURCES

BACKGROUND OF THE INVENTION

Many recording and playback tape systems for magnetic tape have been designed to be portable or for installation in vehicles, such as automobiles. In such circumstances these systems are often powered from low voltage DC power sources, such as batteries. For example, stereophonic tape systems designed for automobiles are designed to accept the vehicle's 12-volt battery as their power source. Similarly, fully portable recording and playback tape systems are likewise designed for battery operation.

As a result, the conventional tape recording and playback systems of the portable variety employ the DC source voltage to drive the amplifier components, including the pre-amplifiers, and utilize an oscillator to provide the alternating voltage to drive the bias and erase circuits. While such an arrangement will perform satisfactorily, higher DC voltages to drive the amplifiers and pre-amplifiers have many benefits. For example, when employing ICs in the pre-amplifiers and amplifiers, a higher drive voltage; i.e., about 24-volts DC will reduce the heating of these components and thus the distortion caused thereby. Further, with the increased voltage the wattage output can be greatly increased without changing any of the components which result in better overall performance from the system.

It was previously indicated that conventional tape recording and playback systems employ an oscillator to provide the drive of the bias and erase circuits. These oscillators tend to involve rather complex circuits with a large number of parts which often represent a substantial part of the total cost of the tape recording and playback system. For achieving satisfactory performance, the drive on these circuits should have a frequency of 30 kHz. or above and represent a single function, highly specialized circuit within the system.

Therefore, it is an object of the present invention to provide a new circuit arrangement for tape recording and playback systems which increases the DC source voltage to the amplifier circuits and provides a high frequency, 30 kHz. to 100 kHz., voltage to drive the bias and erase circuits without employing a conventional oscillator.

A collateral object is to achieve improved performance from tape recording and playback systems employing ICs which are powered from DC power sources of 14-volts or less.

Another object is a circuit arrangement which will lower the costs of portable or vehicular tape recording and playback systems.

Other objects and advantages will be apparent from the description of the invention in this specification.

SUMMARY OF THE INVENTION

In a tape recording and playback system having a mechanical tape transport and at least one channel having a recording and playing head, an erasing head and a speaker, an improved circuit associated therewith comprising an inverter having a primary, a secondary, a core and switching transistors capable of developing a frequency of at least 30 kHz. in said secondary, said inverter having its input connected to a low voltage DC power source and its output connected to drive the bias on said recording and playback head and said erasing head of said tape recording and playback system, a pair of diodes connected to said switching transistors, said diodes being coupled to a common capacitor to form a voltage rectifying and doubling circuit, an amplifying circuit having its input connected to said recording and playback head and its output connected to said speaker, and leads coupling said voltage doubling circuit to said amplifier circuit to power the same.

The output of the inverter may include shaping components to modify its wave form and typically the amplifying circuit will include a pre-amplifier and a power amplifier both of which are transistor or integrated circuits. Normally, the system will include two channels for stereophonic operation and will be employed in tape stereophonic systems for automobiles along with the associated balance and volume controls.

BRIEF DESCRIPTION OF THE DRAWING

The invention will be better understood by reference to the attached drawing, schematically illustrating the circuit in the preferred form of the invention. Since the tape transport mechanism is conventional, it is not illustrated. Reference is made to U.S. Pat. No. 3,437,762 as illustrating a typical tape transport suitable for association with the illustrated circuit.

DESCRIPTION OF AN EMBODIMENT

Referring to the drawing, a low voltage direct current source 10, such as a 12-volt automobile battery, is connected to the center tapped primary 12 of the transformer 11 of the inverter circuit through high speed switching transistors 15 and 16. The transformer typically will employ a toroid high frequency ferrite core and the switching rate of the transistors need to be sufficient to achieve a frequency of 30 to 100 kHz. in the secondary of the transformer.

A feedback winding 14 is also wound on the core of transformer 11 and has its center tap connected to primary 12 through a resister 13 to bias the voltage supplied to the switching transistors. By connecting the base of each switching transistor through leads 17 and 18 respectively to opposite ends of the feedback winding, these transistors are alternately switched on and off by the voltage induced in the feedback windings when the circuit is connected as illustrated. With one lead of the direct current source 10 being connected to the center tap of the primary and switching transistor alternately connecting the other lead to the opposite ends of the primary, an alternating voltage is induced in the secondary 35 of the transformer. The center tap of the feedback winding which switches the transistors on and off is also connected to the negative side (ground) of the low voltage source 10 through a filter circuit 19 containing a resistance and a capacitance to eliminate transit voltages in the feedback circuits.

Employing approximately 20 turns in the primary and 100 turns in the secondary of transformer 11, a suitable inverter can be constructed for a 10-watt tape recording and playback system, wherein an alternating voltage of 60 to 100 volts RMS at a frequency of from 30 to 100 kHz. will be available in the secondary to drive the bias and erase circuits. Obviously, even though NPN-transistors are illustrated, PNP-transisters could be employed as well with minor circuit changes to accommodate the necessary changes in polarity.

In order to provide a DC voltage greater than the low voltage source, two diodes, 30 and 31 respectively, are connected to the collectors of the switching transistors 16 and 17 respectively. The anodes of these diodes are connected to one side of a common capacitor 32 which has its opposite side connected to ground (negative side of the low voltage source 10). Through this arrangement, a voltage doubling circuit is formed and the voltage on an output lead will be double the source voltage. As switching occurs on one-half cycle, one diode will charge the associated capacitor to the valve of the voltage source while on the next half cycle the other diode conducts and due the reversal in polarity the capacitor voltage adds to the source voltage, doubling it. Therefore, a voltage of 24 volts, assuming a 12-volt source, will be available on lead 34 to power the power amplifier circuits, assuming no load.

The alternating voltage induced in the secondary 35 of the transformer 11 may be shaped by means of an inductance or choke coil 36 and a capacitor 37. The inductance and capacitance are selected to convert the irregular wave form of the current flow into a simusoidal wave for use in biasing both the erase head 40 and the recording and playback head 41 of the tape playing unit. A biasing control circuit formed by a variable resistance or a variable compacitance 43 is disposed in the connection between the ends of the coils of the tape recording and playback head and the output of the shaping components to adjust the level of the bias on this head. A switch is employed to simultaneously connect and disconnect the recording and playback head and the erasing head or vice versa when employed.

The remainder of the system can comprise a channel having a pre-amplifier 50, a power amplifier stage 51, and a speaker 52. A companion channel of the system in a stereo embodiment also includes an erasing head 53 and recording and playback head 54, pre-amplifier 55 and a power amplifier 56 which in turn is coupled to the speaker 57. Both channels are identical and therefore only a single channel is described in complete detail.

The output of the recording and playback head 41 is coupled to the base of the first transistor 61 of the pre-amplifier 50 through a capacitor 60. The collector of the first stage transistor is coupled to the positive side of the low voltage DC source 10 through a load resistor 62 while the emitter side is coupled through a resistor 67 to ground 33. The first stage transistor is coupled directly to the base of the second stage transistor 63 and the second stage transistor is coupled through a load resistor 64 to the positive side of the power supply and through a resistor 68 to ground. A feedback circuit from the output side of the second stage to the first stage is provided through the capacitor 65 and the resistance 66. These two stages of the pre-amplifier will amplify the signal and supply the signal to the input of the power amplifier 51.

In the connection between the pre-amplifier and the power amplifier there is disposed a balancing resistor 69 which is coupled between the outputs of the two pre-amplifiers of the system in the stereo embodiment. Resistor 69 is a potentiometer whose value can be varied to balance the signal between the separate channels. Also disposed in the connection between each pre-amplifier and its associated power amplifier is a volume control potentiometer 71 which will adjust the amplitude and thus the volume of the signal in the channel. The pre-amplifiers are coupled to the base of a field transistor 70 which forms the first stage of the power amplifier. The collector of the field effect transistor is coupled to the second stage 75 while its emitter side is coupled to a gain or level control formed by a potentiometer 72 and a capacitor 73 to equalize amplifiers. Similarly, the emitter side is coupled through a balancing resistor 74 to the common connection between the output stages formed by the transistors 80 and 81 to set voltages. Since the transistors 80 and 81 form a transformerless push-pull output stage one must be a PNP-transistor while the other is a NPN-transistor. The second stage transistor 75 of the power amplifier is coupled to the bases of the two output transistors 80 and 81 with a diode and resistor 82 being disposed in the connection between the bases of transistors 80 and 81 for bias. The two output transistors 80 and 81 are coupled to the coil of the speaker 52 and form a conventional push-pull final output stage. A bootstrap circuit including a resistor 83 is provided between the output side of the push-pull stage and its input side. The pre-amplifier and power amplifier of each channel preferably are integrated circuits such as Motorola MC 1302L and GE PA246.

OPERATION

The preferred embodiment operates by coupling a 12-volt DC power supply or battery to the input side of the inverter. The inverter switches the 12-volt power supply to generate an alternating current flow in the primary of the transformer which induces an alternating current flow in the secondary. The induced alternating current flow is shaped by the circuit coupled to the secondary of the transformer to provide a high frequency simusoidal alternating current for energizing the erase and the recording and playback heads of the tape unit.

The switching currents in the primary are also supplied to the voltage doubling circuit formed by two parallel diodes connected to a capacitor forming a voltage doubling circuit that forms an important feature of the present invention since it effectively doubles battery supply to supply more than 20 volts for powering the power amplifiers of the system. As explained, conventional solid state circuits have higher peak output, perform better, and are less subject to drift, distortion and other malfunctions if they are powered from a high voltage supply. Thus, the inverter of the present invention supplies both the alternating current for the tape heads and the high voltage DC required for better performance from the power amplifiers.

The remainder of this system operates in a conventional manner wherein the erase head is energized when one desired to erase the signal recorded on the tape while the recording and playback heads are energized when it is desired to record on the tape or play back a previously recorded signal. In the case of a playback, the signal is supplied to the pre-amplifier and power amplifier where it is amplified and reproduced by the speaker of each channel in the system. Of course, a companion (stereo) signal will be reproduced in the other channel of the system in the stereo embodiments.

I claim:

1. In a DC powered magnetic tape recording and playback system having a magnetic tape transport and at least one channel having a speaker, recording and playback head, and an erase head arranged to cooperate with said transport, a combined bias supply and internal DC voltage doubling supply circuit comprising:

- a transformer with a core, a primary and a secondary;
- a pair of solid state switching devices operably coupled between a DC source and said primary to generate a frequency of at least 30 kHz. in said secondary;
- switch means coupled to said secondary and said recording and playback head and said erase head to alternately connect said heads with said secondary;
- a pair of diodes and a capacitor with a common lead of each diode connected in a junction with one side of said capacitor, one of said diodes having its opposite lead commonly connected to one of said solid state switching devices and its connection to said primary, said other diode having its opposite lead commonly connected to the other of said solid state switching devices and its connection to said primary, said capacitor having its opposite side connected to a common ground with said DC power source;
- an amplifying circuit in said at least one channel having its signal input coupled to said recording and playback head, its output coupled to said speaker and at least one of its power inputs coupled to said junction of said capacitor and said diodes whereby a DC voltage higher than said DC source will power said amplifier.

2. The combination as defined in claim 1 wherein a shaping circuit is employed between the output of the secondary and its connection with the recording and playback head and the erasing head.

3. The combination defined in claim 1 wherein the core is a ferrite core.

4. The combination as defined in claim 1 wherein the solid state switching devices are high speed switching transistors and the primary includes multiple windings.

5. The combination as defined in claim 4 wherein the switching capacity of the transistors is sufficient to obtain a frequency of from 30 to 100 kHz. in the secondary.

6. The DC power magnetic tape recording and playback system defined in claim 1 wherein said system includes a plurality of channels, said plurality of channels being connected in parallel to said combined bias supply and internal DC voltage doubling supply circuit.

7. The combination as defined in claim 6 wherein the recording playback system is designed for approximately a 12–14 DC power source and integrated circuits are employed in the amplifying circuits of each channel.

8. The combination of claim 6 wherein the amplifying circuits of each channel are interconnected with a variable resistance to obtain balance between said plurality of channels.